L. B. ARTHUR.
INTERNAL COMBUSTION ENGINE.
APPLICATION FILED MAR. 26, 1912.

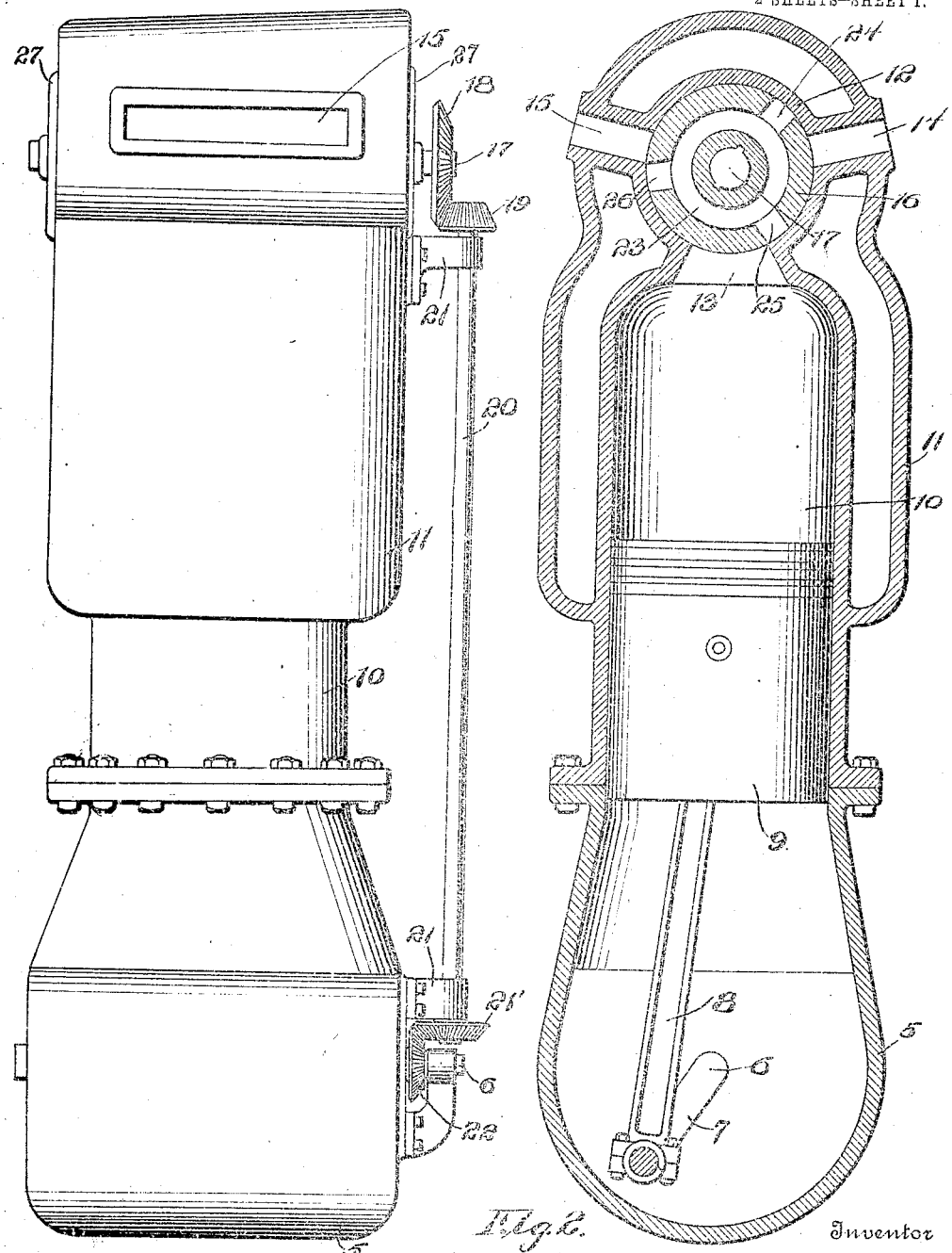

1,116,002.

Patented Nov. 3, 1914.
2 SHEETS—SHEET 2.

Witnesses
Wm H Mulligan

Inventor
Lewis B. Arthur.
By Victor J. Evans
Attorney

UNITED STATES PATENT OFFICE.

LEWIS B. ARTHUR, OF COLUMBUS, OHIO.

INTERNAL-COMBUSTION ENGINE.

1,116,002.

Specification of Letters Patent. Patented Nov. 3, 1914.

Application filed March 26, 1912. Serial No. 686,271.

*To all whom it may concern:*

Be it known that I, LEWIS B. ARTHUR, a citizen of the United States, residing at Columbus, in the county of Franklin and State of Ohio, have invented new and useful Improvements in Internal-Combustion Engines, of which the following is a specification.

The invention relates to explosion engines, and more particularly to the class of internal combustion engines.

The primary object of the invention is the provision of an engine of this character in which a rotary valve is arranged for controlling the intake and exhaust ports during the operation thereof for assuring perfectly silent and uniform working of the engine and eliminating reciprocating parts, as well as pockets in the cylinder to avoid the accumulation of gases.

Another object of the invention is the provision of a rotary valve in an internal combustion engine which will afford straight inlet and exhaust passages to and from the cylinder thereby avoiding sharp angles therein to retard the flow of gases, and in this manner maximum power will result as well as a more complete scavenging of the cylinder, thereby maintaining high efficiency in the working of the engine.

Another object of the invention is the provision of a valve for internal combustion engines in which all cam shafts, idle gears, valve springs and push rods are eliminated in the engine and to assure during the operation of the latter on the exhaust stroke, the scavenging of the cylinder and on the suction stroke a more complete charge, and also to effect a greater compression as well as combustion directly over the piston thereby increasing the power and effectiveness of the engine.

A further object of the invention is the provision of a valve for internal combustion engines in which a continuous rotary movement will be imparted thereto directly from the crank shaft operated upon by the piston of the engine so as to assure correctness in the opening and closing of the intake and exhaust ports in the cylinder.

A further object of the invention is the provision of a valve for internal combustion engines which is simple in construction, thoroughly reliable and efficient in operation and inexpensive in manufacture.

With these and other objects in view the invention consists in the construction, combination and arrangement of parts as will be hereinafter more fully described, illustrated in the accompanying drawings, and pointed out in the claims hereunto appended.

Figure 3:
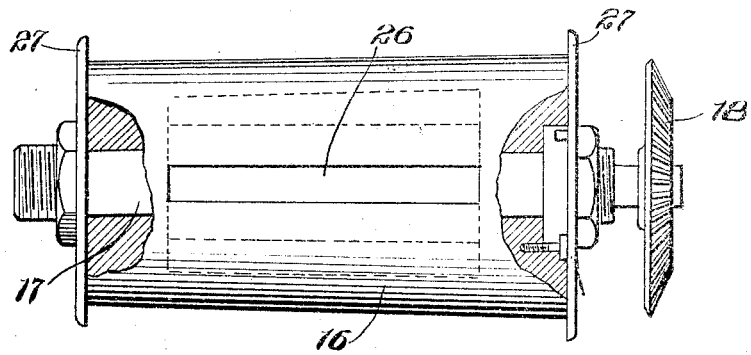
Figure 4:
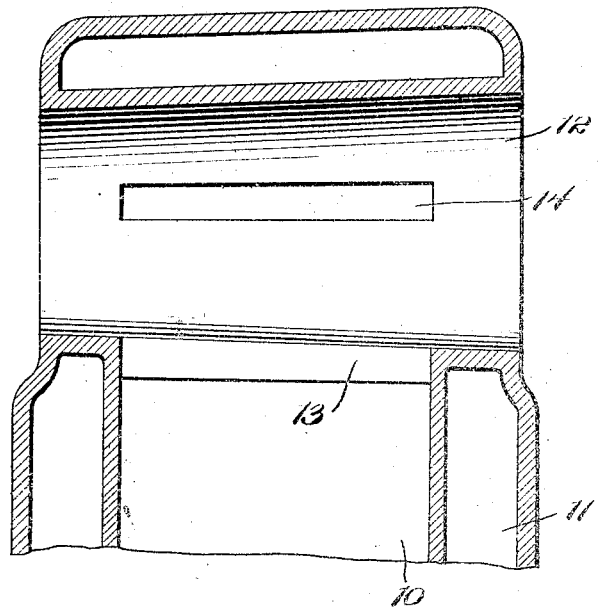

In the drawings: Figure 1 is a side elevation of an internal combustion engine constructed in accordance with the invention, showing the valve driving mechanism exteriorly thereof. Fig. 2 is a vertical longitudinal sectional view through the engine. Fig. 3 is a side elevation of the valve removed from the engine the same being partly in section. Fig. 4 is a fragmentary vertical longitudinal sectional view through the engine showing the valve removed.

Similar reference characters indicate corresponding parts throughout the several views in the drawing.

Referring to the drawings by numerals the internal combustion engine comprises the usual crank casing 5 which is made integral and provided with a bearing for the crank shaft 6, the same being formed with a crank 7 which is connected by means of a piston rod 8 to a piston 9, adapted to operate within the cylinder 10 in the ordinary well-known manner, the said cylinder being provided with a water jacket 11 or other cooling means of the usual type.

Formed in the head or crown of the cylinder 10 is a transversely disposed cylindrical tapering valve seat 12 communicating through a passage 13 directly with the cylinder 10, and this head or crown is provided at opposite sides with intake and exhaust openings 14 and 15 respectively, the same opening through the outer wall of the water jacket 11, the intake 14 being in communication with a supply conduit leading from a carbureter not shown of the ordinary well-known type, while the exhaust port 15 communicates with the ordinary pipe exhaust not shown.

Fitted within the valve seat 12 is a correspondingly-shaped valve plug 16 mounted upon and fixed to a turning spindle or axle 17 which has fixed at one end thereof a beveled gear 18 meshing with a beveled pinion 19 fixed on one end of a rotatable valve shaft 20 journaled in suitable bearings 21 projecting from the cylinder 10, the opposite end of the valve shaft being provided with a pinion 21' meshing with a gear 22 fixed to one end of the crank shaft 6, the pinions and gears being of a size to permit the valve plug 16 to rotate at one-sixth of the speed of the crank shaft thereby diminishing the wear to a minimum on the valve plug and seat therefor.

The valve plug 16 is formed with an annular space concentrically disposed with respect to the axis of movement thereof, the space 23 being substantially the length of the said plug and being designed for establishing communication between ports 24, 25 and 26 respectively, which are formed in the outer wall of the said plug 16 and are arranged at equal distances apart. These ports will register with the respective port 13, intake and exhaust openings 14 and 15, on the working of the valve plug. When the engine is operating the valve plug 16 is continuously rotated in its seat 12 so that when traveling the slot 24 will be brought into registration with the intake port 14 at the proper time for the inlet stroke, at this instant the slot 25 will be in communication with the passage 13 so as to admit a charge of fluid directly into the cylinder 10 and at this instant the exhaust port 15 is closed so as to avoid the escape of the charge admitted into the cylinder, and this exhaust port remains closed during the entire inlet or suction stroke. Also the slot 24 remains in communication with the intake port 14 during the entire inlet or suction stroke, and thereafter the said intake port is closed at the proper time and simultaneously therewith the passage 13 is closed for the compression and combustion strokes. At the proper time for the exhaust stroke, the exhaust port 15 is uncovered to permit the spent gases in the cylinder to escape therefrom during the entire exhaust stroke and such operation of the valve plug 16 is repeated during the continued working of the engine.

It is of course understood that there is employed in the engine any ordinary well-known ignition device or system for effecting the explosion of the gases at the proper intervals during the working of the engine.

By reason of the snug fit of the valve plug 16 in the seat 12 there will be prevented accumulation of deposits of carbon between the valve and its seat and also by mounting the said valve plug in the said seat for rotation, it will be prevented from lifting and in this manner leakage will be obviated.

Adjustably and detachably mounted upon the spindle 17 which is mounted centrally in the valve plug 16 in any suitable manner are end closure disks or plates 27, the same working against opposite open ends of the said seat 12 for the said valve plug.

From the foregoing description, taken in connection with the accompanying drawings, it is thought that the construction and operation of the device will be clearly understood, and therefore, a more extended explanation has been omitted.

What is claimed is:—

1. An internal combustion engine having a valve chamber provided with an inlet opening, an exhaust opening, and a port communicating with the combustion chamber, a valve rotatably journaled transversely in said valve chamber and having a passage concentric to its axis and opening through the outer periphery thereof at three points of the same for registration with the inlet opening, exhaust opening, and said port, the said port during rotation of the valve maintaining such registry with one of the openings in the valve during the time of registry of the remaining openings successively with the exhaust and inlet openings, disks arranged at opposite ends of the valve and working against the valve chamber walls, and means locking said disks against outward displacement with respect to the valve.

2. A casing formed with a cylinder having an inlet opening, an exhaust opening, and a combustion chamber passage having communication with the inlet and exhaust openings, a valve rotatably mounted in the cylinder and having ports to successively register with said inlet opening, exhaust opening, and combustion chamber passage, and also provided with a chamber for establishing communication between the ports, the said combustion chamber passage being of a size to maintain registry therewith of one of the ports of the valve during the successive registration of the other ports of said valve with the inlet opening and exhaust opening in the cylinder.

In testimony whereof I affix my signature in presence of two witnesses.

LEWIS B. ARTHUR.

Witnesses:
D. G. MESSMORE,
L. P. LAWRENCE.